(12) United States Patent
Suzuki et al.

(10) Patent No.: US 9,806,354 B2
(45) Date of Patent: Oct. 31, 2017

(54) METHOD FOR MANUFACTURING REINFORCED MEMBRANE ELECTRODE ASSEMBLY AND REINFORCED MEMBRANE ELECTRODE ASSEMBLY

(71) Applicant: W. L. Gore & Associates, Co., Ltd., Tokyo (JP)

(72) Inventors: Yoichi Suzuki, Tokyo (JP); Tomoya Nomura, Tokyo (JP); Takuya Kosaka, Tokyo (JP); Shinichi Nishimura, Tokyo (JP)

(73) Assignee: W. L. Gore & Associates, Co., Ltd., Tokyo (JP)

(*) Notice: Subject to any disclaimer, the term of this patent is extended or adjusted under 35 U.S.C. 154(b) by 0 days.

(21) Appl. No.: 15/172,889

(22) Filed: Jun. 3, 2016

(65) Prior Publication Data

US 2016/0359178 A1     Dec. 8, 2016

Related U.S. Application Data

(62) Division of application No. 13/384,291, filed as application No. PCT/JP2010/063954 on Aug. 12, 2010, now Pat. No. 9,385,387.

(30) Foreign Application Priority Data

Aug. 12, 2009  (JP) ................. 2009-187130

(51) Int. Cl.
*H01M 8/10*      (2016.01)
*H01M 8/0286*   (2016.01)
(Continued)

(52) U.S. Cl.
CPC ....... *H01M 8/0286* (2013.01); *B29C 45/0046* (2013.01); *B29C 45/14336* (2013.01);
(Continued)

(58) Field of Classification Search
CPC ......... B29C 45/14336; B29C 45/14811; B29C 45/0046; B29C 45/14836; H01M 8/0276;
(Continued)

(56) References Cited

U.S. PATENT DOCUMENTS

| 2005/0014056 A1 | 1/2005 | Zuber et al. | |
| 2006/0078781 A1* | 4/2006 | Stegink | H01M 8/028 429/128 |

(Continued)

FOREIGN PATENT DOCUMENTS

| EP | 2048730 A1 | 4/2009 |
| JP | 10-199551 A | 7/1998 |

(Continued)

OTHER PUBLICATIONS

Supplementary European Search Report for Application No. EP 10 80 8271 dated Nov. 26, 2013.

*Primary Examiner* — Gary Harris
(74) *Attorney, Agent, or Firm* — Kilpatrick Townsend & Stockton, LLP

(57) ABSTRACT

To provide a manufacturing method of a membrane electrode assembly which improves the reliability of seal, mechanical strength, and handling ability of a solid polymer type fuel cell. The manufacturing method of a membrane electrode assembly according to the present invention prepares a membrane electrode assembly which differs in size of gas diffusion layers at an anode side and cathode side, provides the outer peripheral edge of the membrane electrode assembly with a resin frame by molding, and, at that time, provides projections or a concave part and convex part at a top mold and bottom mold used for the molding so as to keep to a minimum the penetration of the resin frame (Continued)

material to the gas diffusion layers and/or electrode layers and prevent warping of the outer peripheral edges of the larger gas diffusion layer etc.

12 Claims, 3 Drawing Sheets

(51) Int. Cl.
| | |
|---|---|
| H01M 8/0258 | (2016.01) |
| H01M 8/242 | (2016.01) |
| B29C 45/00 | (2006.01) |
| B29C 45/14 | (2006.01) |
| H01M 8/0276 | (2016.01) |
| H01M 8/1004 | (2016.01) |
| H01M 8/0273 | (2016.01) |
| B29L 12/00 | (2006.01) |
| B29L 31/34 | (2006.01) |
| H01M 8/0247 | (2016.01) |
| H01M 8/1018 | (2016.01) |

(52) U.S. Cl.
CPC .. *B29C 45/14811* (2013.01); *B29C 45/14836* (2013.01); *H01M 8/0258* (2013.01); *H01M 8/0273* (2013.01); *H01M 8/0276* (2013.01); *H01M 8/1004* (2013.01); *H01M 8/1018* (2013.01); *H01M 8/242* (2013.01); *B29L 2012/00* (2013.01); *B29L 2031/3468* (2013.01); *H01M 8/0247* (2013.01); *H01M 2008/1095* (2013.01); *Y02E 60/521* (2013.01); *Y02P 70/56* (2015.11)

(58) Field of Classification Search
CPC .............. H01M 8/0286; H01M 8/1004; H01M 8/0247; H01M 2008/1095; B29L 2012/00; B29L 2031/3468; Y02E 60/521
USPC ................................................. 429/480, 535
See application file for complete search history.

(56) References Cited

U.S. PATENT DOCUMENTS

| | | |
|---|---|---|
| 2010/0038020 A1 | 2/2010 | Hori et al. |
| 2010/0047649 A1 | 2/2010 | Yamada et al. |

FOREIGN PATENT DOCUMENTS

| | | |
|---|---|---|
| JP | 2007-66766 A | 3/2007 |
| JP | 2008-123885 A | 5/2008 |
| JP | 2009-158391 A | 7/2009 |
| WO | WO-03/063280 A2 | 7/2003 |

\* cited by examiner

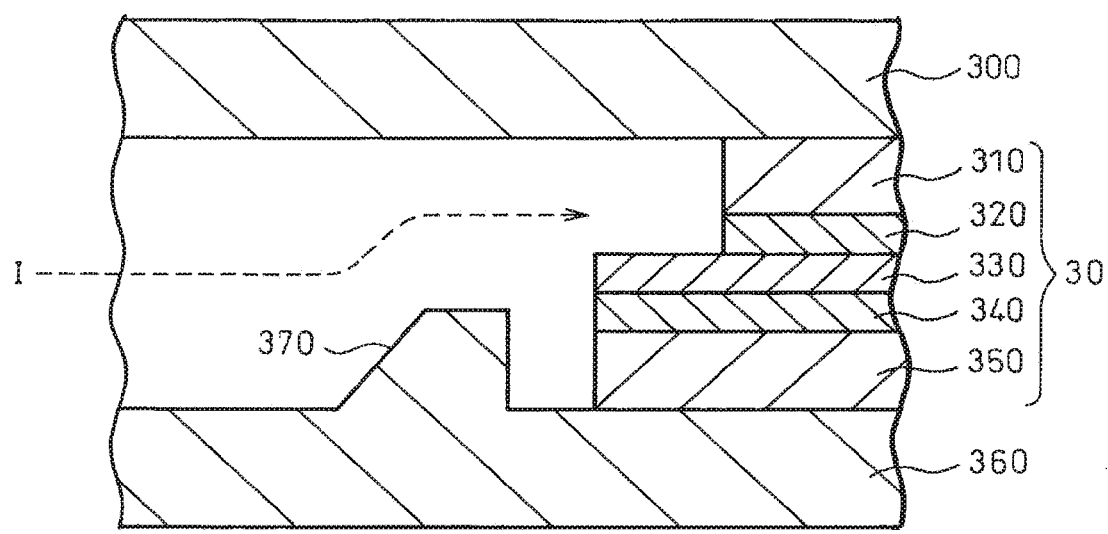
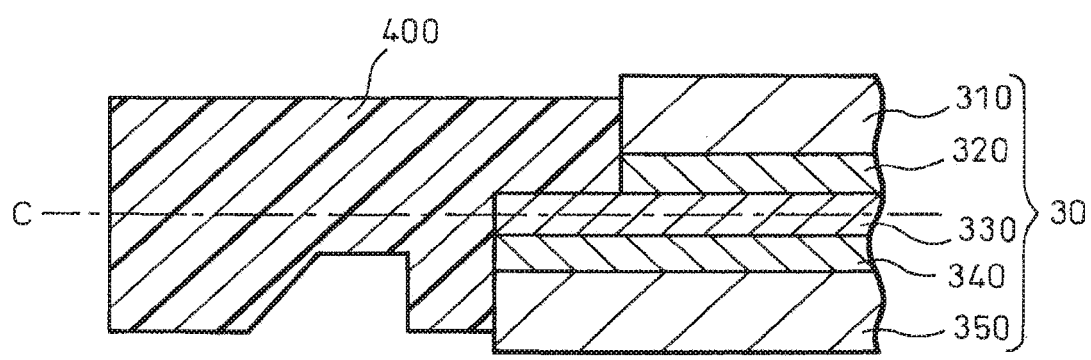

METHOD FOR MANUFACTURING REINFORCED MEMBRANE ELECTRODE ASSEMBLY AND REINFORCED MEMBRANE ELECTRODE ASSEMBLY

The present application is a divisional application of issued U.S. application Ser. No. 13/384,291, filed on May 1, 2012, issued as 9,385,387on Jul. 5, 2016, which is a U.S. national-stage entry of PCT/JP2010/0963954, filed on Aug. 12, 2010,and claims priority to Japanese Pat. Appl. No. 2009-187130, filed on Aug. 12, 2009, which applications are incorporated herein by reference in their entirety.

TECHNICAL FIELD

The present invention relates to a manufacturing method of a reinforced membrane electrode assembly for a solid polymer type fuel cell.

BACKGROUND ART

In recent years, fuel cells have been garnering attention as high efficiency energy conversion devices. Fuel cells are roughly classified by the type of electrolyte used into alkali types, solid polymer types, phosphoric acid types, and other low temperature operation fuel cell, molten carbonate types, solid oxide types, and other high temperature operation fuel cells. Among these, solid polymer type fuel cells (PEFC) using polymer electrolyte membranes having ion conductivity as electrolytes enable a high output density to be obtained by a compact structure and further do not use a liquid for the electrolyte and enable operation at a low temperature etc., so enable realization of a simple system, so are being focused on for stationary use, vehicular use, mobile phone use, etc.

A solid polymer type fuel cell has as its basic principle to expose one side of a polymer electrolyte membrane to a fuel gas (hydrogen etc.) and its opposite side to an oxidizing agent gas (air etc.), use the chemical reaction via the polymer electrolyte membrane to synthesize water, and take out the reaction energy produced due to this as electricity. A polymer electrolyte membrane at the two sides of which porous catalyst electrodes are arranged and joined by a hot press etc. is generally called a "membrane electrode assembly (MEA)". An MEA can be independently handled. Packing is arranged between the MEA and separators so as to prevent leakage of the reaction gases to the outside. A polymer electrolyte membrane has ion conductivity, but does not have gas permeability and electron conductivity, so acts to physically and electronically separate the fuel electrode and the oxygen electrode. If the polymer electrolyte membrane is smaller in size than the porous catalyst electrodes, at the inside of the MEA, the porous catalyst electrodes will electrically short-circuit and, further, the oxidizing agent gas and fuel gas will mix (cross leak), so the function as a battery will be lost. Furthermore, in the case of a type of fuel cell which directly feeds methanol or another liquid fuel, the liquid fuel will leak from the fuel electrode side to the oxygen electrode side and thereby the function as a battery will be impaired. For this reason, the area of the polymer electrolyte membrane has to be equal to or greater than the areas of the porous catalyst electrodes. Therefore, usually, the polymer electrolyte membrane is made to extend beyond the peripheral edges of the porous catalyst electrodes and is clamped between the packing and separators so as to form a gas seal and supporting structure.

In this respect, a polymer electrolyte membrane is an extremely thin film shaped material, so is hard to handle. When bonded with the electrodes, at the time of assembly stacking a plurality of unit cells to form a stack, etc., the peripheral edges, which are important for sealing the reaction gases, frequently end up being wrinkled. In a unit cell or stack assembled using a polymer electrolyte membrane in such a wrinkled state, there is a high possibility of the reaction gases leaking out from the wrinkled parts. Further, even in a state with no wrinkles etc. at all, the polymer electrolyte membrane is the member with the lowest mechanical strength among all constituent members forming a stack, so is easily damaged. Therefore, to improve solid polymer type fuel cells in reliability, maintenance, etc., reinforcement of the polymer electrolyte membrane part is desired. Furthermore, as explained above, to prevent electrical short-circuits at the peripheral edges of the polymer electrolyte membrane, in the past, MEAs including electrolyte membranes with areas larger than the electrode layers so that the polymer electrolyte membranes extend laterally over the ends of the electrode layers have been produced. However, when fabricating an MEA with an electrolyte membrane and electrode layers of different sizes, these have to be separately cut out and positioned. The increase in processes invites a drop in productivity.

Known in the art is a method of applying to the peripheral edges of an MEA, which has a polymer electrolyte membrane of the same size as the gas diffusion electrodes or larger than the gas diffusion electrodes, a thermoplastic polymer by injection molding, compression molding, or other means so that the thermoplastic polymer is impregnated at the insides of the sealing ends of the gas diffusion support members and envelops the peripheral regions of both gas diffusion support members and the polymer electrolyte membrane thereby forming an integral membrane electrode assembly having a fluid impermeable seal of a thermoplastic polymer (PLT 1).

Further, to effectively reinforce the polymer electrolyte membrane and greatly improve the handling ability of a fuel cell structure, the method is known of press fitting a frame member over the outer peripheral edges of the porous bodies fastened to the two surfaces of the polymer electrolyte membrane and strongly and reliably joining the porous bodies and frame member (PLT 2).

CITATION LIST

PLT 1: Japanese Patent Publication (A) No. 2005-516350
PLT 2: Japanese Patent Publication (A) No. 10-199551

SUMMARY OF INVENTION

Technical Problem

In the method described in PLT 1, if applying a thermoplastic polymer by injection molding to the peripheral edges of an MEA having a polymer electrolyte membrane larger than the gas diffusion electrodes, the part of the electrolyte membrane extending over the peripheral edges of the gas diffusion electrodes will move due to the flow of resin at the time of injection molding to thereby be exposed at the surface or a load will be applied to the electrolyte membrane part at the edge parts of the gas diffusion electrodes resulting in breakage and consequently possible gas leakage. Further, depending on the molding pressure and permeation pressure of the molding resin, the resin will excessively penetrate into the gas diffusion electrodes. Resin which excessively penetrates to the inside of the gas diffusion electrodes is liable to squeeze the electrolyte membrane of the MEA or disperse the fastening pressure of the cell when the MEA is assembled into the fuel cell and as a result damage the MEA and cause a drop in its performance. On the other hand, for the peripheral parts of the gas diffusion electrodes, the space inside the mold is extremely narrow, so the molding resin will sometimes not be able to reach part of the gas diffusion electrodes and the seal parts will not be able to be precisely formed.

Further, in the method described in PLT 1, when applying a thermoplastic polymer by injection molding to the peripheral edges of an MEA having a polymer electrolyte member of the same size as the gas diffusion electrodes and the sizes of the gas diffusion electrodes at the anode side and cathode side differ, the part of the polymer electrolyte membrane which is bonded with the large side gas diffusion electrode will sometimes be peeled off from the gas diffusion electrode due to the flow of the molding resin. Furthermore, the space in the mold for forming the top part of the polymer electrolyte membrane which is bonded to the large side gas diffusion electrode is narrow, so the resin easily is insufficiently filled there resulting in defects.

In the method described in PLT 2, it is difficult to sufficiently press fit and strongly join the frame member to the outer peripheral edges of the porous body and it is extremely difficult to reliably seal the interface between the frame member and MEA, so problems such as leakage of gas from the joints and destruction of the cell can occur.

Therefore, an object of the present invention is to control the penetration of molding resin to the gas diffusion layers and/or electrode layers when providing an MEA with a reinforcement-use resin frame. In particular, when providing a reinforcement-use resin frame at an MEA different in size of the gas diffusion layers at the anode side and cathode side, the object is to prevent warping of the peripheral edges of the large side of the MEA due to resin flow and, further, to prevent peeling of the polymer electrolyte membrane from the gas diffusion layers and/or electrode layers while making the MEA and resin frame match at centers of thickness. Overall, the present invention has as its object the improvement of the reliability of the seal, the mechanical strength, and the handling ability of a solid polymer type fuel cell.

Solution to Problem

According to the present invention, (1) A manufacturing method of a reinforced membrane electrode assembly for solid polymer type fuel cell use comprising
preparing a membrane electrode assembly including a polymer electrolyte membrane, a first electrode layer which is provided on one side of the electrolyte membrane, a first gas diffusion layer which is provided on the first electrode layer on the side opposite to the electrolyte membrane, a second electrode layer which is provided on the other side of the electrolyte membrane, and a second gas diffusion layer which is provided on the second electrode layer on the side opposite to the electrolyte membrane, in which membrane electrode assembly, the first gas diffusion layer and the first electrode layer being arranged on the surface of the electrolyte membrane so that the outer peripheral edge of the first gas diffusion layer as a whole fits within the range of the outer peripheral edge of the electrolyte membrane and so that a surface region of the electrolyte membrane remains between the outer peripheral edge of the first electrode layer and the outer peripheral edge of the electrolyte membrane across the entire circumference of the outer peripheral edge of the first electrode layer and the second gas diffusion layer being extended up to at least part of the opposite side from the surface region across the entire circumference of the outer peripheral edge of the electrolyte membrane and
providing, at the membrane electrode assembly, a resin frame by molding so as to surround all of the outer peripheral edge of the electrolyte membrane and at least the parts of the outer peripheral edges of the first and second gas diffusion layers near the first and second electrode layers and so as to fasten at least part of the surface region, at which time,
providing a top mold and bottom mold used for the molding with projections, the projections partially compressing at least parts of the first and second gas diffusion layers, the compressed part of the first gas diffusion layer being arranged to be at a farther position than the compressed part of the second gas diffusion layer as seen from a center part of the membrane electrode assembly, whereby penetration of the resin frame material to the first gas diffusion layer and/or the first electrode layer is kept to a minimum and whereby warping and formation of the outer peripheral edges of the electrolyte membrane, the second electrode layer, and the second gas diffusion layer are prevented.

Further, according to the present invention, there is provided:

(2) A method as set forth in (1) wherein the projections are arranged to compress a part near the outer peripheral edge of the first gas diffusion layer.

Further, according to the present invention, there is provided:

(3) A method as set forth in (1) or (2) wherein the projections are arranged in rim edge shapes continuously or discontinuously.

Further, according to the present invention, there is provided:

(4) A manufacturing method of a reinforced membrane electrode assembly for solid polymer type fuel cell use comprising
preparing a membrane electrode assembly including a polymer electrolyte membrane, a first electrode layer which is provided on one side of the electrolyte membrane, a first gas diffusion layer which is provided on the first electrode layer on the side opposite to the electrolyte membrane, a second electrode layer which is provided on the other side of the electrolyte membrane, and a second gas diffusion layer which is provided on the second electrode layer on the side opposite to the electrolyte membrane, in which membrane electrode assembly, the first gas diffusion layer and the first electrode layer being arranged on the surface of the electrolyte membrane so that the outer peripheral edge of the first gas diffusion layer as a whole fits within the range of the outer peripheral edge of the electrolyte membrane and so that a surface region of the electrolyte membrane remains between the outer peripheral edge of the first electrode layer and the outer peripheral edge of the electrolyte membrane across the entire circumference of the outer peripheral edge of the first electrode layer and the second gas diffusion layer being extended up to at least part of the opposite side from the surface region across the entire circumference of the outer peripheral edge of the electrolyte membrane and providing, at the membrane electrode assembly, a resin frame by molding so as to surround all of the outer peripheral edge of the electrolyte membrane and at least the parts of the outer peripheral edges of the first and second gas diffusion layers near the first and second electrode layers and so as to fasten at least part of the surface region, at which time, providing a top mold and bottom mold used for the molding respectively with a concave and convex part so that part or all of the membrane electrode assembly is curved and the surface region of the electrolyte membrane forms a slanted surface, whereby a front end of flow of the resin frame material strikes the surface region.

Further, according to the present invention, there is provided:

(5) A manufacturing method of a reinforced membrane electrode assembly for solid polymer type fuel cell use comprising preparing a membrane electrode assembly including a polymer electrolyte membrane, a first electrode layer which is provided on one side of the electrolyte membrane, a first gas diffusion layer which is provided on the first electrode layer on the side opposite to the electrolyte membrane, a second electrode layer which is provided on the other side of the electrolyte membrane, and a second gas diffusion layer which is provided on the second electrode layer on the side opposite to the electrolyte membrane, in which membrane electrode assembly, the first gas diffusion layer and the first electrode layer being arranged on the surface of the electrolyte membrane so that the outer peripheral edge of the first gas diffusion layer as a whole fits within the range of the outer peripheral edge of the electrolyte membrane and so that a surface region of the electrolyte membrane remains between the outer peripheral edge of the first electrode layer and the outer peripheral edge of the electrolyte membrane across the entire circumference of the outer peripheral edge of the first electrode layer and the second gas diffusion layer being extended up to at least part of the opposite side from the surface region across the entire circumference of the outer peripheral edge of the electrolyte membrane and providing, at the membrane electrode assembly, a resin frame by molding so as to surround all of the outer peripheral edge of the electrolyte membrane and at least the parts of the outer peripheral edges of the first and second gas diffusion layers near the first and second electrode layers and so as to fasten at least part of the surface region, at which time, arranging projections at a mold, among a top mold and bottom mold used for the molding, closer to the second gas diffusion layer and at an outer side from an outer peripheral edge of the second gas diffusion layer, whereby a front end of flow of the resin frame material does not strike an interface between the electrolyte membrane and the second electrode layer.

Further, according to the present invention, there is provided:

(6) A method as set forth in (5), wherein the projections have tapered shapes whereby a change of path of progression of the front end of flow at the time of the molding is promoted.

Further, according to the present invention, there is provided:

(7) A method as set forth in (5) or (6) wherein the projections are arranged in rim edge shapes continuously or discontinuously.

Further, according to the present invention, there is provided:

(8) A reinforced membrane electrode assembly for solid polymer type fuel cell use which is produced by a method as described in any one of (1) to (7).

Further, according to the present invention, there is provided:

(9) A reinforced membrane electrode assembly for solid polymer type fuel cell use as set forth in (8) wherein a center of thickness of the membrane electrode assembly and a center of thickness of the resin frame substantially match.

Advantageous Effects of Invention

According to the present invention, when providing an MEA with a reinforcement-use resin frame, excessive penetration of the molding resin to the gas diffusion layers and/or electrode layers is prevented. In particular, according to the present invention, when providing an MEA different in size of the gas diffusion layers at the anode side and cathode side with a reinforcement-use resin frame, warping of the peripheral edges at the large side of the MEA due to the flow of resin is prevented. Further, peeling of the gas diffusion layers and/or electrode layers from the polymer electrolyte membrane is prevented and, at the reinforced membrane electrode assembly, the MEA and resin frame match in centers of thickness. Therefore, according to the present invention, the reliability of the seal, mechanical strength, and handling ability in a solid polymer type fuel cell are improved.

BRIEF DESCRIPTION OF DRAWINGS

FIG. 3 is a partial lateral cross-sectional view showing a state of setting a membrane electrode assembly in a mold in a method according to another aspect of the present invention.

FIG. 4 is a partial lateral cross-sectional view showing a membrane electrode assembly obtained in the method shown in FIG. 3.

Figure 1:
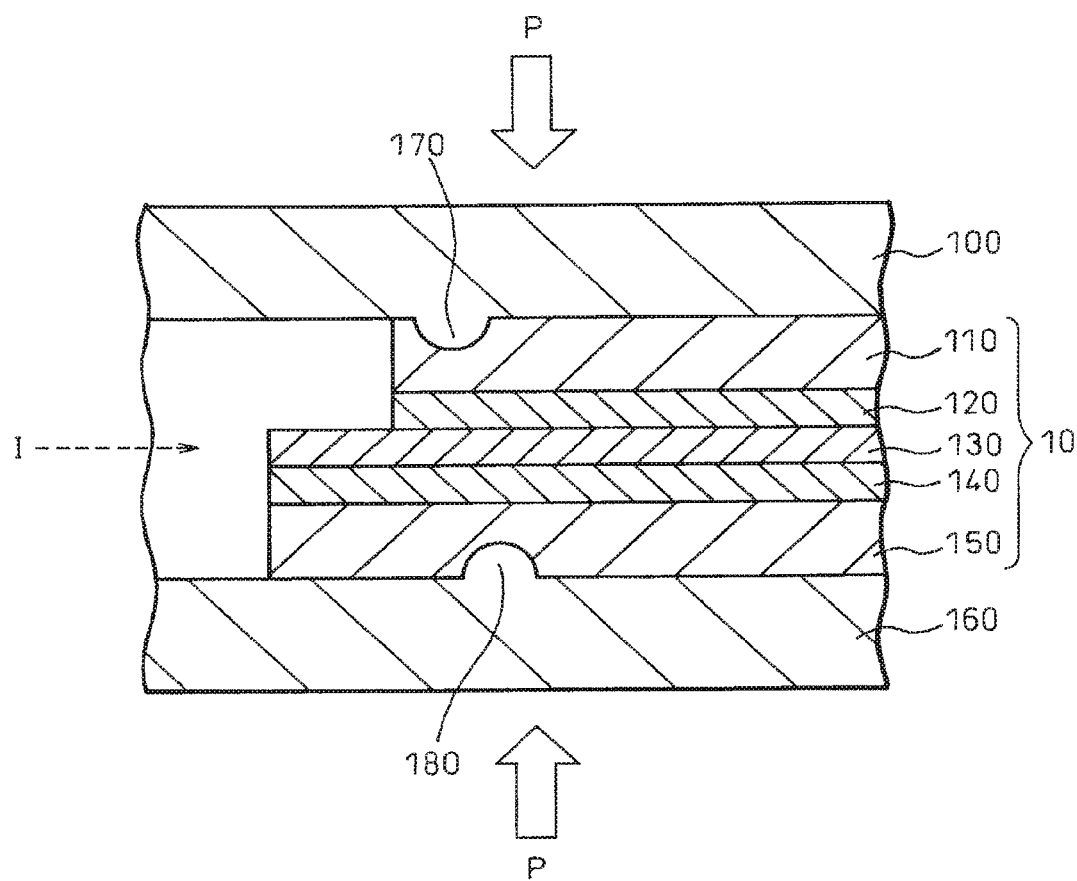
FIG. 1 is a partial lateral cross-sectional view showing a state of setting a membrane electrode assembly in a mold in a method according to the present invention.

REFERENCE SIGNS LIST 10, 20, 30 membrane electrode assembly
100, 200, 300 top mold
110, 210, 310 first gas diffusion layer
120, 220, 320 first electrode layer
130, 230, 330 polymer electrolyte membrane
140, 240, 340 second electrode layer
150, 250, 350 second gas diffusion layer
160, 260, 360 bottom mold
170, 180, 370 projection
400 resin frame

DESCRIPTION OF EMBODIMENTS

Below, the present invention will be explained in detail while referring to the drawings. Note that, the drawings are drafted schematically for facilitating the understanding of the invention. Please note that the relative relationships (ratios) of sizes of the illustrated members do not accurately show the actual relationships of sizes in the embodiment.

The present invention provides, as method of controlling the penetration of molding resin to the gas diffusion layers and/or electrode layers when providing the MEA with a reinforcement-use resin frame, a manufacturing method of a reinforced membrane electrode assembly for solid polymer type fuel cell use comprising preparing a membrane electrode assembly including a polymer electrolyte membrane, a first electrode layer which is provided on one side of the electrolyte membrane, a first gas diffusion layer which is provided on the first electrode layer on the side opposite to the electrolyte membrane, a second electrode layer which is provided on the other side of the electrolyte membrane, and a second gas diffusion layer which is provided on the second electrode layer on the side opposite to the electrolyte membrane, in which membrane electrode assembly, the first gas diffusion layer and the first electrode layer being arranged on the surface of the electrolyte membrane so that the outer peripheral edge of the first gas diffusion layer as a whole fits within the range of the outer peripheral edge of the electrolyte membrane and so that a surface region of the electrolyte membrane remains between the outer peripheral edge of the first electrode layer and the outer peripheral edge of the electrolyte membrane across the entire circumference of the outer peripheral edge of the first electrode layer and the second gas diffusion layer being extended up to at least part of the opposite side from the surface region across the entire circumference of the outer peripheral edge of the electrolyte membrane and providing, at the membrane electrode assembly, a resin frame by molding so as to surround all of the outer peripheral edge of the electrolyte membrane and at least the parts of the outer peripheral edges of the first and second gas diffusion layers near the first and second electrode layers and so as to fasten at least part of the surface region, at which time, providing a top mold and bottom mold used for the molding with projections, the projections partially compressing at least parts of the first and second gas diffusion layers, the compressed part of the first gas diffusion layer being arranged to be at a farther position than the compressed part of the second gas diffusion layer as seen from a center part of the membrane electrode assembly, whereby penetration of the resin frame material to the first gas diffusion layer and/or the first electrode layer is kept to a minimum and whereby warping and formation of the outer peripheral edges of the electrolyte membrane, the second electrode layer, and the second gas diffusion layer are prevented.

One means for preventing penetration of the resin frame material to the gas diffusion layers and/or electrode layers according to the present invention is shown in FIG. 1. FIG. 1 is a partial lateral cross-sectional view showing the state of setting a membrane electrode assembly 10 in a mold. FIG. 1 shows parts of the membrane electrode assembly 10, that is, a polymer electrolyte membrane 130, a first electrode layer 120, a first gas diffusion layer 110, a second electrode layer 140 which is provided on the other side of the electrolyte membrane, and a second gas diffusion layer 150. Furthermore, it shows a top mold 100 and a bottom mold 160 for molding. The top mold 100 is provided with a projection 170. At the time of molding, due to pressure from the direction shown by the arrow P, the part of the gas diffusion layer 110 which is struck by the projection 170 is at least partially compressed. Therefore, penetration of the resin frame material mainly to the insides of the gas diffusion layer 110 and/or electrode layer 120 due to the flow of resin frame material shown by the broken line arrow I is suppressed or prevented. On the other hand, the bottom mold 160 is provided with a projection 180. At the time of molding, due to pressure from the direction shown by the arrow P, the part of the gas diffusion layer 150 which is struck by the projection 180 is at least partially compressed. Therefore, penetration of the resin frame material mainly to the insides of the gas diffusion layer 150 and/or electrode layer 140 due to the flow of resin frame material shown by the broken line arrow I is suppressed or prevented.

According to the present invention, the projections 170 and 180 are arranged so that the compressed part of the gas diffusion layer 110 is positioned farther than the compressed part of the gas diffusion layer 150 from the center part of the membrane electrode assembly 10 (left in FIG. 1) so that the outer peripheral edges of the electrolyte membrane 130, second electrode layer 140, and second gas diffusion layer 150 do not warp upward due to the pressure from the direction shown by the arrow P. To strongly join the resin frame to the MEA, it is necessary to make the resin frame material penetrate the outer peripheral edges of the gas diffusion layers and/or electrode layers to a certain extent so as to exhibit an anchor effect. On the other hand, the parts of the gas diffusion layers and/or electrode layers which the resin frame material penetrates are impaired in gas diffusion function, so from the viewpoint of not causing a reduction in the effective reaction area of the solid polymer type fuel cell, it is desired to reduce the region of penetration of the resin frame material as much as possible. Therefore, in the case of an MEA where the sizes of the gas diffusion layers at the anode side and cathode side differ, it is preferable to arrange the projection 170 so as to compress the part of the smaller gas diffusion layer (in FIG. 1, the first gas diffusion layer 110) near the outer peripheral edge. Here, "the part of the smaller gas diffusion layer near the outer peripheral edge", while depending on the properties and shape of the individual specific material, generally indicates a range from the end to about 5 mm inward. However, the inventors observed that with just arranging the projection 170 at the part of the first gas diffusion layer 110 near the outer peripheral edge, due to the action of easing the strain at the part compressed by the projection 170 due to pressure from the direction shown by the arrow P, the outer peripheral edges of the larger gas diffusion layer (in FIG. 1, the second gas diffusion layer 150) warps upward. A molded article obtained by molding in the state with the outer peripheral edges of the gas diffusion layers etc. warped upward (resin frame reinforced membrane electrode assembly) is liable to cause gas leakage, electrical short-circuits, etc. The inventors discovered that by providing the projection 180 at the bottom mold 160 so that the compressed part of the first gas diffusion layer 110 is positioned farther than the compressed part of the second gas diffusion layer 150 from the center part of the membrane electrode assembly, warping of the outer peripheral edges of the second gas diffusion layer 150 etc. is prevented. While not constrained by any specific theory, the action of easing of distortion of the part compressed by the projection 170 is cancelled out by the action of easing of distortion of the part compressed by the projection 180 arranged somewhat inward compared with the projection 170. As a result, warping of the outer peripheral edges of the second gas diffusion layer 150 etc. is considered to be prevented.

As the condition for arrangement of the projection 180 at which such warping is prevented, while depending also on the properties and shapes of the individual specific materials, this should be made within about 3 mm inward from the position of the bottom mold corresponding to the top part of the projection 170, preferably 0.5 to 2 mm in range. Further, as the shape of projections, in addition to the semicircular cross-section such as shown in FIG. 1, a triangular shape, square shape, or rhomboid shape are also possible. The height of the projections should be made within 5 to 85% of the thickness of the MEA, preferably 10 to 30% in range. Further, the height of the projections should be made 50 to 1500% of the thickness of the MEA, preferably 125 to 1000% in range. The projections may be arranged at the mold in rim edge shapes continuously or discontinuously. When providing the projections discontinuously, provision at corresponding locations at the top mold and bottom mold is preferable. As one example, in the case of an MEA of a thickness of 400 µm using carbon paper for the gas diffusion layers, a mode arranging a top projection having a semicircular cross-sectional shape of a height of 80 µm and a width of 1 mm at a corresponding position of the top mold 1 mm inward from the outer peripheral edge end of the smaller diffusion layer and arranging a bottom projection having a semicircular cross-sectional shape of a height of 80 µm and a width of 1 mm at a corresponding position of the bottom mold 1 mm inward from the top of the top projection, is illustrated.

Figure 2:
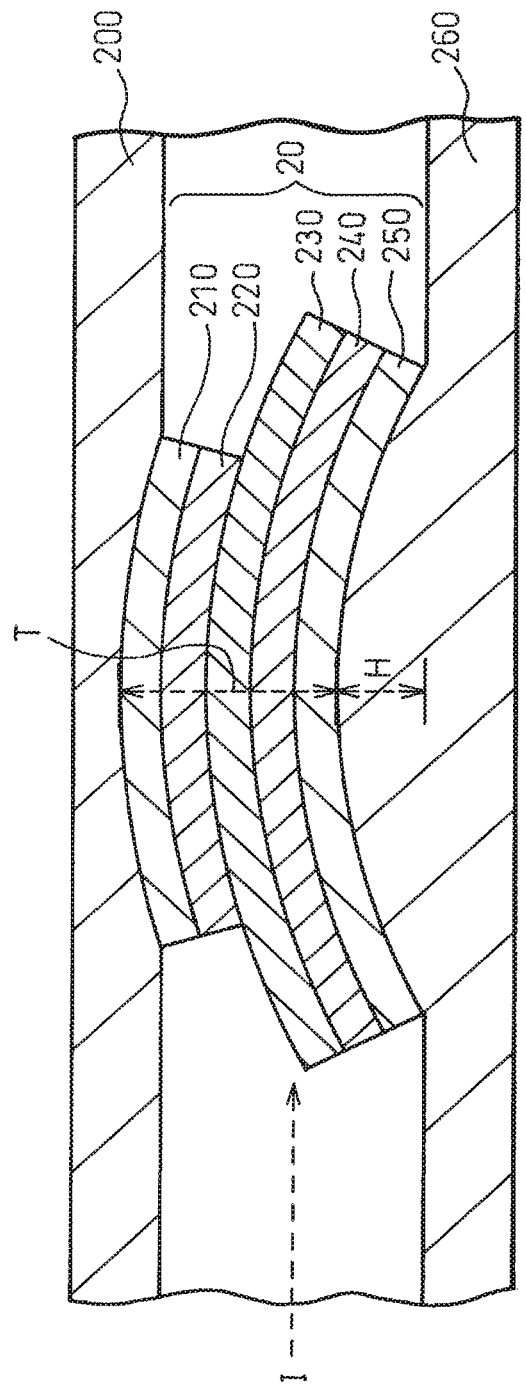
FIG. 2 is a partial lateral cross-sectional view showing a state of setting a membrane electrode assembly in a mold in a method according to another aspect of the present invention.

Another means for suppressing or preventing penetration of the resin frame material to the gas diffusion layers and/or electrode layers according to the present invention is shown in FIG. 2. FIG. 2 is a partial lateral cross-sectional view showing a state of setting a membrane electrode assembly 20 in a mold. FIG. 2 shows parts of the membrane electrode assembly 20, that is, a polymer electrolyte membrane 230, a first electrode layer 220, a first gas diffusion layer 210, a second electrode layer 240 which is provided on the other side of the electrolyte membrane, and a second gas diffusion layer 250. Furthermore, it shows a top mold 200 and a bottom mold 260 for molding. The top mold 200 and the bottom mold 260 are provided with a convex part and a corresponding concave part so that the membrane electrode assembly 20 curves overall with the substantial center part of the first gas diffusion layer 210 as the vertex. At the time of molding, as illustrated, the front end of flow (broken line arrow I) of the resin frame material strikes the surface region (slanted surface) of the polymer electrolyte membrane 230. Therefore, at the time of molding, peeling of the polymer electrolyte membrane 230 from the gas diffusion layer 250 and/or electrode layer 240 due to the flow of resin is prevented and warping of the outer peripheral edges of the second gas diffusion layer 250 is prevented. Furthermore, by the front end of flow (broken line arrow I) of the resin frame material initially striking the surface region (slanted surface) of the polymer electrolyte membrane 230, the flow rate of the resin frame material when striking the gas diffusion layer 210 and/or electrode layer 220, that is, the pressing action, falls, so penetration of the resin frame material to the inside of the gas diffusion layer 210 and/or electrode layer 220 is suppressed or prevented. Note that, in the mode shown in FIG. 2, the membrane electrode assembly 20 is curved overall, but so long as a surface region (slanted surface) of the polymer electrolyte membrane 230 is formed which the front end of flow of the resin frame material strikes, it is also possible to respectively provide the convex part and concave part at the top mold 200 and the bottom mold 260 so that only part of the membrane electrode assembly 20, for example, peripheral edges, is curved.

The concave and convex parts which are provided at the top mold 200 and the bottom mold 260, while depending on the size of the membrane electrode assembly 20, can give the above effects by making the height H of the convex part 5 to 50% in range of the thickness T of the corresponding part of the membrane electrode assembly.

Further, by the shrinkage stress of the molding resin frame and the repulsion force of the membrane electrode assembly canceling each other out after molding, deformation (warping and distortion) of the reinforced membrane electrode assembly as a whole is prevented. Note that, in FIG. 2, the molding resin frame is mounted to the membrane electrode assembly 20 substantially parallel to the horizontal, but the mounting angle of the resin frame is not particularly limited. A desired angle can be set in accordance with the application.

Furthermore, the present invention provides, as another method of controlling the penetration of molding resin to the gas diffusion layers and/or electrode layers when providing the MEA with a reinforcement-use resin frame, a manufacturing method of a reinforced membrane electrode assembly for solid polymer type fuel cell use comprising preparing a membrane electrode assembly including a polymer electrolyte membrane, a first electrode layer which is provided on one side of the electrolyte membrane, a first gas diffusion layer which is provided on the first electrode layer on the side opposite to the electrolyte membrane, a second electrode layer which is provided on the other side of the electrolyte membrane, and a second gas diffusion layer which is provided on the second electrode layer on the side opposite to the electrolyte membrane, in which membrane electrode assembly, the first gas diffusion layer and the first electrode layer being arranged on the surface of the electrolyte membrane so that the outer peripheral edge of the first gas diffusion layer as a whole fits within the range of the outer peripheral edge of the electrolyte membrane and so that a surface region of the electrolyte membrane remains between the outer peripheral edge of the first electrode layer and the outer peripheral edge of the electrolyte membrane across the entire circumference of the outer peripheral edge of the first electrode layer and the second gas diffusion layer being extended up to at least part of the opposite side from the surface region across the entire circumference of the outer peripheral edge of the electrolyte membrane and providing, at the membrane electrode assembly, a resin frame by molding so as to surround all of the outer peripheral edge of the electrolyte membrane and at least the parts of the outer peripheral edges of the first and second gas diffusion layers near the first and second electrode layers and so as to fasten at least part of the surface region, at which time, arranging projections at a mold, among a top mold and bottom mold used for the molding, closer to the second gas diffusion layer and at an outer side from an outer peripheral edge of the second gas diffusion layer, whereby a front end of flow of the resin frame material does not strike an interface between the electrolyte membrane and the second electrode layer. According to this method, it is possible to prevent the peeling of the polymer electrolyte membrane from the gas diffusion layers and/or electrode layers while making the centers of thickness of the membrane electrode assembly and resin frame match.

One means for preventing the front end of flow of the resin frame material from striking the interface between the polymer electrolyte membrane and the second electrode layer according to the present invention is shown in FIG. 3. FIG. 3 is a partial lateral cross-sectional view showing the state of setting the membrane electrode assembly in a mold. FIG. 3 shows parts of a membrane electrode assembly 30, that is, a polymer electrolyte membrane 330, a first electrode layer 320, a first gas diffusion layer 310, a second electrode layer 340 which is provided on the other side of the electrolyte membrane, and a second gas diffusion layer 350. Furthermore, it shows a top mold 300 and a bottom mold 360 for molding. The bottom mold 360 is provided with projections 370 at the outer side from the outer peripheral edge of the second gas diffusion layer 350. By arranging the projections 370 in this way, it is possible to prevent the front end of flow (broken line arrow I) of the resin frame material from striking the interface between the polymer electrolyte membrane 330 and the second electrode layer 340. Therefore, at the time of molding, peeling of the polymer electrolyte membrane 330 from the gas diffusion layer 350 and/or electrode layer 340 due to the flow of resin is prevented.

An example of the reinforced membrane electrode assembly obtained by the mode shown in FIG. 3 is shown in FIG. 4. FIG. 4 is a partial lateral cross-sectional view showing a membrane electrode assembly which is reinforced by a resin frame. FIG. 4 shows parts of a membrane electrode assembly 30, that is, a polymer electrolyte membrane 330, a first electrode layer 320, a first gas diffusion layer 310, a second electrode layer 340 which is provided on the other side of the electrolyte membrane, a second gas diffusion layer 350, and a resin frame 400. According to the present invention, the center of thickness of the membrane electrode assembly 30 and the center of thickness of the resin frame 400 substantially match (one dot chain line C) except for recesses corresponding to the projections 370. By the centers of thickness of the membrane electrode assembly 30 and the resin frame 400 substantially matching, when further stacking membrane electrode assemblies reinforced by resin frames to prepare a fuel cell stack, it becomes possible to substantially uniformly compress the anode part and cathode part of the membrane electrode assembly 30.

As a condition for provision of the projections 370 enabling prevention of peeling of the polymer electrolyte membrane from the gas diffusion layers and/or electrode layers while making the centers of thickness of the membrane electrode assembly and resin frame match, while also depending on the properties and shape of the individual specific material, provision at least about 0 mm or more outward from the outer peripheral edge ends of the second gas diffusion layer, preferably at intervals of 0.05 to 0.5 mm, is preferable. At the time of molding, it is possible for the resin frame material to flow into the spaces formed by the intervals and strongly join the MEA and the resin frame. Further, the shape of the projections 370 is not particularly limited, but if the cross-section is a tapered shape as shown in FIG. 3, it is possible to make the front end of flow (broken line arrow I) smoothly displace without disturbing the flow of the resin frame material, so this is preferable. The height of the projections should be made 20 to 85% of the thickness of the MEA, preferably 30 to 50% in range. Further, the width of the projections is preferably kept to a minimum so long as a width is secured sufficient for providing an effective taper. The projections can be provided in the mold as rim edge shapes continuously or discontinuously. As one example, in the case of an MEA of a thickness of 400 μm using carbon paper for the gas diffusion layers, a mode arranging projections having a taper of a height of 150 μm and a width (base part) of 2 mm at intervals of 0.3 mm outward from the outer peripheral ends of the second gas diffusion layer may be mentioned.

The polymer electrolyte membrane which is used for the membrane electrode assembly according to the present invention is not particularly limited so long as it has a high ion conductivity, electron insulating ability, and gas impermeability. A known polymer electrolyte membrane is sufficient. As typical examples, proton ($H^+$) conductive resins having skeletons of fluorine-containing polymers and having sulfonic acid groups, carboxyl groups, phosphoric acid groups, phosphono groups, or other groups may be mentioned. The thickness of the polymer electrolyte membrane has a large effect on the resistance, so a thinner membrane is sought so long as not detracting from the electron insulating ability and gas impermeability, specifically the thickness is set to 5 to 50 μm, preferably 10 to 30 μm in range. As typical examples of the polymer electrolyte membrane, perfluoro polymers having sulfonic acid groups at their side chains such as a Nafion® membrane (made by DuPont) and Flemion® membrane (made by Asahi Glass) may be mentioned. Further, a reinforced type polymer electrolyte membrane comprised of an expanded porous polytetrafluoroethylene membrane in which an ion exchange resin is impregnated such as GORE-SELECT® (made by Japan Gore-tex) may be suitably used.

The electrode layer which is used for the membrane electrode assembly according to the present invention is not particularly limited so long as including catalyst particles and an ion exchange resin. A conventional known one may be used. The catalyst is usually comprised of a conductive material carrying catalyst particles. The catalyst particles should be ones having a catalytic action on the oxidation reaction of hydrogen or reduction reaction of oxygen. In addition to platinum (Pt) or other precious metals, iron, chrome, nickel, etc. and alloys of the same may be used. As the conductive material, carbon particles, for example carbon black, activated carbon, graphite, etc., are suitable. In particular, fine powder particles are preferably used. Typically, carbon black particles of a surface area of 20 $m^2$/g or more carrying precious metal particles, for example Pt particles or particles of an alloy of Pt and other metals are used. In particular, for an anode catalyst, Pt is susceptible to carbon monoxide (CO) poisoning, so when using a fuel containing CO such as methanol, use of particles of an alloy of Pt and ruthenium (Ru) is preferable. The ion exchange resin in the electrode layers is a material which supports the catalyst and serves as a binder forming the electrode layers and performs the role of forming passages for movement of ions etc. formed by the catalyst. As such an ion exchange resin, ones similar to those explained in relation to the polymer electrolyte membrane can be used. The electrode layers are preferably porous so that, at the anode side, hydrogen, methanol, and other fuel gas, and, at the cathode side, oxygen, air, and other oxidizing agent gas can contact the catalyst as much as possible. Further, the amount of catalyst contained in the electrode layers is 0.01 to 1 mg/$cm^2$, preferably 0.1 to 0.5 mg/$cm^2$ in range. The thickness of the electrode layers is generally 1 to 20 μm, preferably 5 to 15 μm in range.

The gas diffusion layer which is used for the membrane electrode assembly according to the present invention is a sheet material having conductivity and gas permeability. As typical examples, carbon paper, carbon woven fabric, carbon nonwoven fabric, carbon felt, or another gas permeable conductive base material treated to make it water repellent may be mentioned. Further, it is also possible to use a porous sheet which is obtained from carbon particles and a fluororesin. For example, it is possible to use a porous sheet obtained by forming carbon black into a sheet using polytetrafluoroethylene as a binder. The gas diffusion layer as a thickness of generally 50 to 500 μm, preferably 100 to 200 μm in range.

The electrode layer, gas diffusion layer, and polymer electrolyte membrane are bonded to fabricate a membrane electrode assembly. As the bonding method, any conventional known method may be employed so long as a dense bond with a low contact resistance can be achieved without harming the polymer electrolyte membrane. At the time of bonding, it is possible to first assemble the electrode layer and the gas diffusion layer to form the anode electrode or cathode electrode, then bond these to the polymer electrolyte membrane. For example, it is possible to use a suitable solvent to prepare a coating solution for electrode layer formation use including catalyst particles and an ion exchange resin and coat this on a sheet material for gas diffusion layer use so as to form an anode electrode or cathode electrode and bond these to the polymer electrolyte membrane by a hot press. Further, it is also possible to assemble the electrode layer with the polymer electrolyte membrane, then assemble the gas diffusion layer at its electrode layer side. When assembling the electrode layer and the polymer electrolyte membrane, the screen printing method, spray coating method, decal method, or other conventional known method may be employed.

The resin material for the resin frame used for the membrane electrode assembly according to the present invention, as a precondition, exhibits sufficient stability, specifically heat resistance, acid resistance, hydrolysis resistance, creep resistance, etc. in the usage environment of the fuel cell. Further, the resin material is preferably provided with characteristics suitable for molding, particularly preferably is high in fluidity at the time of molding. Furthermore, when the resin material is a thermoplastic resin, its mold shrinkage is preferably small. Further, when a thermosetting resin, its curing shrinkage is preferably small. As the specific examples of the thermoplastic resin, a liquid crystal polymer (LCP), polyphenylene sulfide (PPS), polyether sulfone (PES), polysulfone (PSF), polyether ether ketone (PEEK), polyimide (PI), polybutylate terephthalate (PBT), polyamide (PA), polypropylene (PP), polyurethane, polyolefin, or other plastics or elastomers may be mentioned. As specific examples of thermosetting resins, an epoxy resin, phenol resin, dicyclopentadiene resin, silicone rubber, fluororubber, ethylene propylene diene rubber (EPDM), or other plastic or elastomer may be mentioned.

The resin frame used for the membrane electrode assembly according to the present invention is provided by molding. The molding includes injection molding, reaction injection molding, transfer molding, direct pressure molding, pour molding, etc. A person skilled in the art can suitably select the molding method in accordance with the properties of the resin used. The MEA at which the resin frame is provided is of a thickness of a level of several hundred μm, so it is necessary to fabricate the mold defining the resin frame so as to comply with this. Further, to prevent a low strength MEA from being crushed at the time of mold clamping, it is preferable to provide a mandrel structure in the mold to adjust the thickness of the MEA part. Furthermore, to prevent the MEA from deviating in position at the time of mold clamping, it is preferable to provide a suction mechanism for fastening the MEA in place. In particular, injection molding, reaction injection molding, and transfer molding are useful in the point that the placement of the insert, the molding, the removal of the molded article, and the rest of the series of work can be completely automated.

By alternately stacking, for 10 to 100 cells, MEAs obtained by in the above way with separators and cooling parts so that the anode sides and the cathode sides of the MEAs become predetermined sides, it is possible to assemble a fuel cell stack.

The invention claimed is:

1. A reinforced membrane electrode assembly for solid polymer type fuel cell use which is produced by a method comprising:
    preparing a membrane electrode assembly including
        a polymer electrolyte membrane,
        a first electrode layer which is provided on one side of said electrolyte membrane,
        a first gas diffusion layer which is provided on said first electrode layer on the side opposite to said electrolyte membrane,
        a second electrode layer which is provided on the other side of said electrolyte membrane, and
        a second gas diffusion layer which is provided on said second electrode layer on the side opposite to said electrolyte membrane;
    in which membrane electrode assembly, said first gas diffusion layer and said first electrode layer are arranged on the surface of said electrolyte membrane
        so that the outer peripheral edge of said first gas diffusion layer as a whole fits within the range of the outer peripheral edge of said electrolyte membrane and
        so that a surface region of said electrolyte membrane remains between the outer peripheral edge of said first electrode layer and the outer peripheral edge of said electrolyte membrane across the entire circumference of the outer peripheral edge of said first electrode layer; and
    in which membrane electrode assembly, said second gas diffusion layer is extended up to at least part of the opposite side from said surface region across the entire circumference of the outer peripheral edge of said electrolyte membrane; and
    providing, at said membrane electrode assembly, a resin frame by molding
        so as to surround all of the outer peripheral edge of said electrolyte membrane and at least the parts of the outer peripheral edges of said first and second gas diffusion layers near said first and second electrode layers, and
        so as to fasten at least part of said surface region,
    wherein said molding comprises providing a top mold and bottom mold with projections,
        said projections partially compressing at least parts of said first and second gas diffusion layers,
        said compressed part of said first gas diffusion layer is near the outer peripheral edge of said first gas diffusion layer at a farther position than said compressed part of said second gas diffusion layer as seen from a center part of said membrane electrode assembly;
    whereby penetration of said resin frame material to said first gas diffusion layer and/or said first electrode layer is kept to a minimum; and
    whereby warping of the outer peripheral edges of said electrolyte membrane, said second electrode layer, and said second gas diffusion layer is prevented.

2. The reinforced membrane electrode assembly as set forth in claim 1 wherein said projections are arranged to compress a part near the outer peripheral edge of said first gas diffusion layer.

3. The reinforced membrane electrode assembly as set forth in claim 1 wherein said projections are arranged in rim edge shapes continuously or discontinuously.

4. The reinforced membrane electrode assembly as set forth in claim 1 wherein a center of thickness of said membrane electrode assembly and a center of thickness of said resin frame substantially match.

5. A method for manufacturing a reinforced membrane electrode assembly for solid polymer type fuel cell use comprising:
preparing a membrane electrode assembly including
a polymer electrolyte membrane,
a first electrode layer which is provided on one side of said electrolyte membrane,
a first gas diffusion layer which is provided on said first electrode layer on the side opposite to said electrolyte membrane,
a second electrode layer which is provided on the other side of said electrolyte membrane, and
a second gas diffusion layer which is provided on said second electrode layer on the side opposite to said electrolyte membrane;
in which membrane electrode assembly, said first gas diffusion layer and said first electrode layer are arranged on the surface of said electrolyte membrane
so that the outer peripheral edge of said first gas diffusion layer as a whole fits within the range of the outer peripheral edge of said electrolyte membrane and
so that a surface region of said electrolyte membrane remains between the outer peripheral edge of said first electrode layer and the outer peripheral edge of said electrolyte membrane across the entire circumference of the outer peripheral edge of said first electrode layer; and
in which membrane electrode assembly, said second gas diffusion layer is extended up to at least part of the opposite side from said surface region across the entire circumference of the outer peripheral edge of said electrolyte membrane; and
providing, at said membrane electrode assembly, a resin frame by molding
so as to surround all of the outer peripheral edge of said electrolyte membrane and at least the parts of the outer peripheral edges of said first and second gas diffusion layers near said first and second electrode layers and
so as to fasten at least part of said surface region,
wherein said molding comprises providing a top mold with a concave part and a bottom mold with a convex part so that part or all of said membrane electrode assembly is curved and said surface region of said electrolyte membrane forms a slanted surface,
whereby a front end of flow of said resin frame material strikes said surface region.

6. A method for manufacturing a reinforced membrane electrode assembly for solid polymer type fuel cell use comprising:
preparing a membrane electrode assembly including
a polymer electrolyte membrane,
a first electrode layer which is provided on one side of said electrolyte membrane,
a first gas diffusion layer which is provided on said first electrode layer on the side opposite to said electrolyte membrane,
a second electrode layer which is provided on the other side of said electrolyte membrane, and
a second gas diffusion layer which is provided on said second electrode layer on the side opposite to said electrolyte membrane,
in which membrane electrode assembly, said first gas diffusion layer and said first electrode layer are arranged on the surface of said electrolyte membrane
so that the outer peripheral edge of said first gas diffusion layer as a whole fits within the range of the outer peripheral edge of said electrolyte membrane and
so that a surface region of said electrolyte membrane remains between the outer peripheral edge of said first electrode layer and the outer peripheral edge of said electrolyte membrane across the entire circumference of the outer peripheral edge of said first electrode layer; and
in which membrane electrode assembly, said second gas diffusion layer is extended up to at least part of the opposite side from said surface region across the entire circumference of the outer peripheral edge of said electrolyte membrane; and
providing, at said membrane electrode assembly, a resin frame by molding
so as to surround all of the outer peripheral edge of said electrolyte membrane and at least the parts of the outer peripheral edges of said first and second gas diffusion layers near said first and second electrode layers and
so as to fasten at least part of said surface region,
wherein said molding comprises arranging projections at a mold, among a top mold and bottom mold used for said molding, closer to said second gas diffusion layer and at an outer side from an outer peripheral edge of said second gas diffusion layer,
whereby a front end of flow of said resin frame material does not strike an interface between said electrolyte membrane and said second electrode layer.

7. A method as set forth in claim 6, wherein said projections have tapered shapes whereby a change of path of progression of said front end of flow at the time of said molding is promoted.

8. A method as set forth in claim 6, wherein said projections are arranged in rim edge shapes continuously or discontinuously.

9. A reinforced membrane electrode assembly for solid polymer type fuel cell use which is produced by a method as described in claim 5.

10. A reinforced membrane electrode assembly as set forth in claim 9 wherein a center of thickness of said membrane electrode assembly and a center of thickness of said resin frame substantially match.

11. A reinforced membrane electrode assembly for solid polymer type fuel cell use which is produced by a method as described in claim 6.

12. A reinforced membrane electrode assembly as set forth in claim 11 wherein a center of thickness of said membrane electrode assembly and a center of thickness of said resin frame substantially match.

* * * * *